United States Patent Office 3,649,712
Patented Mar. 14, 1972

3,649,712
THERMOPLASTIC POLYCARBONATE/POLY-
SULFONE/FLAME RETARDANT BLENDS
Thomas S. Grabowski, Vienna, W. Va., assignor to Borg-
Warner Corporation, Chicago, Ill.
No Drawing. Filed Oct. 23, 1969, Ser. No. 868,883
Int. Cl. C08g 39/10, 51/54, 51/58
U.S. Cl. 260—873                                 4 Claims

ABSTRACT OF THE DISCLOSURE

A thermoplastic composition, which exhibits excellent fire retardant characteristics and high heat distortion temperatures, comprised of a blend of ABS graft polymer, polycarbonate and/or polysulfone with a flame retardant additive. The additive is a flame retardant that is compatible with the thermoplastic blend and does not substantially degrade the physical properties of the composition. The additive also retains the high temperature properties to a greater degree than other known fire retardants.

BACKGROUND OF INVENTION

Prior to this invention, there were a great variety of polymeric compositions tailored to meet given end use applications wherein high heat distortion temperatures were required in combination with processability and moldability. An excellent example of these prior art thermoplastic compositions are the ABS graft polymers such as those prepared by polymerizing styrene and acrylonitrile in the presence of a polymeric backbone such as polybutadiene or a butadiene rubbery copolymer.

These compositions have been very desirable for applications such as telephone casings, furniture housings, vacum cleaner housings and the like, because of their excellent impact strengths and the fact that these applications did not subject the thermoplastic to extremely high temperatures, i.e., greater than about 200° F. Those end uses requiring extremely high temperature stability tended to distort the normally used thermoplastics, at least in some respects. For those end uses, such as motor housings, hot water pipes and the like, where the temperature exceeded the temperature of boiling water, it was necessary that a thermoplastic be used which exhibited a higher heat distortion temperature than normally obtained in thermoplastic materials. Some of the linear high molecular weight polymers were able to withstand heat; however, they were either difficult to process at high temperatures or relatively uneconomical.

SUMMARY OF INVENTION

The present invention is directed to thermoplastic blends that have high heat distortion temperatures, and which may be prepared from relatively economical thermoplastic components. The instant blends are self-extinguishing and have a highly desirable combination of physical properties. The compositions are comprised of: from about 5% by weight to about 90% by weight ABS graft polymer; from about 5% by weight to about 90% by weight of high molecular weight linear polymers selected from the group consisting of polycarbonates, polysulfones, and combinations of polycarbonates and polysulfones; from 0% to about 10% by weight of an antimony-containing fire-retardant additive; and from about 5% by weight to about 40% by weight of an organic fire-retardant additive selected from the group consisting of (1) A compound of the formula:

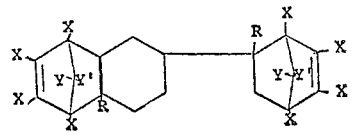

in which X is halogen; Y and Y' are selected from the group consisting of hydrogen, halogen, lower (1–4C) alkyl, lower (1–4C) alkoxy, and halogen substituted lower (1–4C) alkyl and alkoxy radicals; and R is selected from the group consisting of hydrogen, lower (1–4C) alkyl and halogen radicals. The preferred species of this compound is 6-(1',4',5',6',7',7'-hexachloro-5'-norbornen-2'-yl)-1,2,3,4,9,9 - hexachloro - 1,4,4a,5,6,7,8,8a-octahydro-1,4-methanonaphthalene and (2) a polyhaloalkanonaphthalene dicarboxylic acid anhydride (or acid) prepared by the Diels-Alder reaction of a hexahalocyclopentadiene (or pentahalocyclopentadiene) with the condensation product of a $C_4$–$C_{18}$ olefinic dicarboxylic acid anhydride (or acid) with a $C_4$–$C_9$ conjugated diene. The preferred species of this compound is 1,2,3,4,9,9-hexachloro-1,4,4a, 5,6,7,8,8a-octahydro-1,4-methanonaphthalene - 6,7 - dicarboxylic anhydride.

THE GRAFT POLYMER COMPONENT

The preferred graft polymers that are utilized in the present invention are ABS graft polymers, the molecules of which consist of two or more polymeric parts of different composition chemically united. The graft polymer is preferably prepared by polymerizing a conjugated diene such as butadiene or a conjugated diene with a monomer copolymerizable therewith such as styrene to provide a polymeric backbone. After formation of the backbone, at least one grafting monomer and preferably two are polymerized in the presence of the prepolymerized backbone to complete the graft polymer.

The backbone polymer, as mentioned, is preferably a conjugated diene polymer or copolymer such as polybutadiene, butadiene-styrene, butadiene-acrylonitrile or the like.

The specific conjugated diene monomers normally utilized in preparing the backbone of the graft polymer portion of the blends of this invention are generically described by the formula:

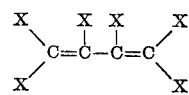

wherein X may be selected from the group consisting of hydrogen, alkyl groups containing from one to five carbon atoms, chloro and bromo. Examples of dienes that may be used are butadiene; isoprene; 1,3 - heptadiene; methyl-1,3-pentadiene; 2,3 - dimethyl-1,3-butadiene; 1,3-pentadiene; 2-methyl-3-ethyl-1,3-butadiene; 2-ethyl - 1,3-pentadiene; 1,3- and 2,4-hexadienes, chloro and bromo substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinylaromatic hydrocarbons. The monovinylaromatic monomers utilized are generically described by the formula:

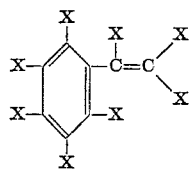

wherein X may be selected from the groug consisting of hydrogen, alkyl groups containing from one to five carbon atoms, chloro and bromo. Examples of the monovinylaromatic compounds and substituted monovinylaromatic compounds that may be used are styrene and other vinyl substituted aromatic compounds including akyl-, cycloalkyl-, aryl-, alkaryl-, aralkyl-, alkoxy-, aryloxy-, and other substituted vinylaromatic compounds. Examples of such compounds are 3-methylstyrene; 3,5-diethylstyrene and 4-n-propylstyrene, vinyltoluene, α-methylstyrene, α-methyl vinyltoluene, α-chlorostyrene, α-bromo-styrene, chlorophenylethylenes, dibromophenylethylenes, tetrachlorophenylethylenes, mixtures thereof and the like. The preferred monovinylaromatic hydrocarbons used herein are styrene and/or α-methylstyrene.

A second group of monomers that may be polymerized in the presence of the prepolymerized backbone are acrylonitrile, substituted acrylonitrile and/or acrylic acid esters exemplified by acrylonitrile and alkyl acrylates such as methyl methacrylate. The acrylonitrile, substituted acrylonitrile, or acrylic acid esters are described generically by the formula:

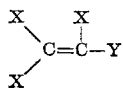

wherein X may be selected from the group consisting of hydrogen, alkyl groups containing from one to five carbon atoms, chloro and bromo and Y is selected from the group consisting of cyano and carbalkoxy wherein the alkyl group of the carbalkoxy group contains from one to about twelve carbon atoms. Examples of monomers of this description, i.e., acrylonitrile, substituted acrylonitrile or acrylic acid esters of the above formula are acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, isobutyl acrylate, mixtures thereof and the like. The preferred acrylic monomer used herein is acrylonitrile and the preferred acrylic acid esters are ethyl acrylate and methyl methacrylate.

In the preparation of the graft polymer, the conjugated diolefin polymer or copolymer exemplified by 1,3-butadiene polymer or copolymer comprises from about 60% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition and the monovinylaromatic hydrocarbon exemplified by styrene comprise from about 30 to about 70% by weight of the total graft polymer composition.

In preparing the graft polymer of this invention, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the compositions used in preparing the graft polymer, a certain percentage of the composition may be an α-methylstyrene-acrylonitrile copolymer (or other copolymer). Also, there are occasions where a copolymer, such as α-methylstyrene-acrylonitrile, is added to the graft polymer copolymer blend. When the graft polymer-copolymer blend is referred to herein, it is meant to include at least one copolymer blended with the graft polymer. It is contemplated in this invention that the graft polymer composition contain up to 90% free copolymer. These copolymers are preferably materials having high heat distortion temperatures such as is the case when α-methylstyrene-acrylonitrile copolymers are prepared and blended with the graft polymer.

THE POLYSULFONES

The polysulfones that may be utilized in the blends of the present invention are polysulfones of the general formula

wherein Ar and Ar' are selected from the group consisting of phenylene and alkyl-, alkoxy-, halogen- and nitro-substituted phenylene and A is selected from the group consisting of carbon-to-carbon bonds, alkylidene, cycloalkylidene, carbonyl, sulfoxide, sulfur, sulfone, azo, imino and oxygen; and $n$ is at least two.

In the formula above, the polysulfones are preferably derived from dichlorodiphenyl sulfones reacted with bisphenols. In a second preferred group, Ar and Ar' are phenylene and A is sulfone. A third major group of polysulfones are prepared wherein Ar and Ar' are phenylene and A is oxygen. When Ar is phenylene, it should preferably be either meta or para and may be substituted in the ring positions with alkyl groups such as methyl, ethyl and propyl. The alkoxy groups above referred to may be groups such as methoxy and propoxy groups. The primary compounds useful in the blends of this invention are those derived from disulfonyl chlorides such as 4,4-biphenyldisulfonyl chloride reacted with diphenyl ether.

The polysulfones useful in this invention may be prepared in a variety of ways such as by nucleophilic aromatic substitution which is described in the Journal of Polymer Sciene, PTA–152375–98 (1967) or by condensation procedures which are described in British Patent 1,060,546.

THE POLYCARBONATES

The polycarbonates utilized in the preparation of the blends of this invention are of the general formulae $$-\!\!\left(\!Ar\!-\!A\!-\!Ar\!-\!O\!-\!\overset{\overset{\displaystyle O}{\|}}{C}\!-\!O\!\right)_{\!\!n}\!\!-\qquad I$$

and $$-\!\!\left(\!Ar\!-\!O\!-\!\overset{\overset{\displaystyle O}{\|}}{C}\!-\!O\!\right)_{\!\!n}\!\!-\qquad II$$

wherein Ar is selected from the group consisting of phenylene and alkyl, alkoxyl, halogen and nitro-substituted phenylene; A is selected from the group consisting of carbon-to-carbon bonds, alkylidene, cycloalkylidene, alkylene, cycloalkylene, azo, imino, sulfur, oxygen, sulfoxide and sulfone, and $n$ is at least two.

The preparation of polycarbonates is well known in the art and the details thereof need not be delineated herein. There are a variety of preparative procedures set forth in Chemistry and Physics of Polycarbonates by Herman Schnell, Interscience Division of John Wiley & Co., New York (1964), first edition, as well as in British Pat. 772,627. In general, a preferred reaction is carried out by dissolving the dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar amounts can be varied dependent upon the reaction conditions.

The preferred polycarbonate utilized in this invention is obtained when Ar is p-phenylene and A is isopropylidene. This polycarbonate is prepared by reacting para, para'-isopropylidenediphenol with phosgene and is sold under the trade name Lexan. Other polycarbonates may be prepared by reacting other dihydroxy compounds, or mixtures of dihydroxy compounds, with phosgene. The dihydroxy compounds may include aliphatic dihydroxy compounds although for best high temperature properties, aromatic rings are essential. The dihydroxy compounds may include within the structure diurethane linkages. Also part of the structure may be replaced by siloxane linkage. These and other variations of polycarbonate structure are described in the Schnell reference cited above. The same reference presents a long list of monomers (particularly dihydroxy compounds) that may be used in polycarbonate synthesis.

HALOGENATED NORBORNENE METHANO-NAPTHALENE COMPOUNDS

The synthesis of the halogenated norbornene methanonapthalene compounds is exemplified by the preparation of 6-(1',4',5',6',7',7-hexachloro-5'-norbornen-2'-yl)-1,2,3,4,9,9 - hexachloro - 1,4,4a,5,6,7,8,8a - octahydro-1,4-methanonapthalene which is herein referred to as CNB. The compound is formed by the Diels Alder reaction of halogenated cyclopentadiene with a diene, such as 4-vinyl-1-cyclohexene, which has partly linear unsaturation and partly cyclic unsaturation. The reaction takes place with 2 moles halogenated cyclopentadiene and 1 mole of the diene. As an example of the preparation, the following procedure may be followed:

8 moles of hexacyclopentadiene and 4 moles of 4-vinyl-1-cyclohexene are mixed together at room temperature. 1 g. of hydroquinone is added as an antioxidant and 3 g. dibutyltin dimaleate is added as a scavenger for traces of hydrogen chloride formed during the reaction. The mixture is stirred and heated for approximately six hours to a maximum temperature of 160° C. When a temperature of 160° C. is reached, an exothermic reaction increases the reaction temperature to approximately 245° C. and the external heating is discontinued and cooling applied. The crude product is dissolved in acetone and purified by filtering through charcoal. The crystals may be further purified by crystallization from acetone. The purified product has a melting point of about 241–243° C.

HALOGENATED SUBSTITUTED CARBOXLIC ACID ANHYDRIDE

As mentioned, the preferred halogenated substituted carboxylic acid anhydride utilized in this invention is 1,2,3,4,9,9 - hexachloro - 1,4,4a,5,6,7,8,8a - octahydro-1,4-methanonapthalene-6,7-dicarboxylic anhydride and is prepared as the reaction product of the condensation of a conjugated aliphatic diene with an unsaturated dicarboxylic acid followed by further condensation of the resultant product with a halosubstituted cycloalkadiene. The Diels Alder condensation between the conjugated aliphatic diene and unsaturated dicarboxylic acids will take place at elevated temperatures, i.e., in the range of from about 175–490° F. and usually at a pressure to maintain at least part of the reactants in a liquid phase. The pressure may be introduced along with the conjugated aliphatic diene. The pressure may also be introduced into the reaction vessel by pressurizing nitrogen or other inert gas into the vessel. If desired, the condensation may be effected in the presence of an inert organic solvent such as an aromatic solvent, i.e., benzene, toluene, o-, m-, p-xylene, etc. The process of preparation may take place either as a batch or continuous reaction.

In preparing the blends of this invention, the components may vary in amount over a very wide range. For example, the graft polymer-copolymer portion may comprise 5–90% by weight of the total composition and correspondingly, the remaining components may comprise 5–90% by weight of polycarbonate and/or polysulfone, 3–40% by weight of organic fire-retardant additive and 0–10% by weight of antimony-containing fire-retardant additive.

The blending of the graft polymer (containing copolymer) along with the polycarbonate and/or polysulfone and the flame retardant additives was accomplished in the instant invention by placing the components in a Banbury mixer and blending until the compositions became homogeneous. The composition was molded into test samples and the physical properties of the samples were determined and recorded in the table set forth below. In the table, the amounts of graft polymer as well as other thermoplastic components of the blend are set forth and all parts are by weight unless otherwise indicated.

FLAME RETARDANT ABS/POLYCARBONATE BLENDS

| | 1[1] | 2[1] | 3 | 4 | 5 | 6 |
|---|---|---|---|---|---|---|
| An ABS graft polymer prepared by polymerizing 35% styrene and 18% acrylonitrile in the presence of 47% polybutadiene and a copolymer comprised of 66% α-methyl styrene, 29% acrylonitrile and 5% styrene (25/75) | | 100 | 76 | 60 | 40 | 20 |
| Polycarbonate of 2,2-(4,4'-dihydroxy-diphenyl) propane | 100 | | 4 | 20 | 40 | 60 |
| 6-(1',4',5',6',7',7-hexachloro-5'-norbornen-2'-yl)-1,2,3,4,9,9-hexachloro-1,4,4a,5,6,7,8,8a-octahydro-1,4-methanonapthalene | | | 20 | 20 | 20 | 20 |
| Antimony oxide (Sb$_2$O$_3$) | | | 3 | 3 | 3 | 3 |
| Microfine high density polyethylene lubricant | 1.0 | 1.0 | 1.0 | 1.0 | 1.0 | 1.0 |
| Tensile yield strength, ASTM D-638-61T (p.s.i.) | 9,100 | 7,700 | 8,100 | 8,500 | 8,800 | 9,400 |
| Elongation at break, ASTM D-638-61T (percent) | 170 | 20 | 10 | 10 | 15 | 45 |
| Tensile modulus, ASTM D-638-61T (×10⁵ p.s.i.) | 3.4 | 4.1 | 4.2 | 4.1 | 4.1 | 4.0 |
| Melt index at 450° F., ASTM 1238-54T modified | 0.4A3 | 0.4A1 | 1.9A1 | 2.1A1 | 2.6A1 | 2.4A1 |
| Izod impact notched, ASTM D-256-56, Method A (ft. lb./in.) | 16.9 | 1.9 | 1.2 | 1.2 | 2.1 | 2.2 |

See footnote at end of table.

FLAME RETARDANT ABS/POLYCARBONATE BLENDS—Continued

| | 1[1] | 2[1] | 3 | 4 | 5 | 6 |
|---|---|---|---|---|---|---|
| Hardness Rockwell R/L, ASTM D-785-62 | 123/99 | 116/92 | 117/93 | 118/95 | 120/99 | 123/102 |
| Heat deflection temperature at 264 p.s.i. load, ASTM D-648-56 (° F. at 10 mils deflection) | 284 | 220 | 212 | 218 | 228 | 236 |
| Underwriters Laboratories flammability at 0.070 in., average for 6 ignitions (sec.) | Fail | Fail | Fail | 7.0 | 2.7 | 2.0 |
| General Electric oxygen index, minimum percent oxygen which will support a flame | 26.5 | 19.1 | 23.9 | 27.3 | 27.6 | 28.8 |

| | 6a[2] | 7[2] | 7a[2] | 8 | 9 | 10 | 11 |
|---|---|---|---|---|---|---|---|
| ABS graft polymer-copolymer, 20% polybutadiene, 52% styrene, 28% acrylonitrile | | 100 | 80 | 76 | 60 | 40 | 20 |
| Polycarbonate of 2,2'-(4,4'-dihydroxy-diphenyl) propane | 100 | | | 4 | 20 | 40 | 60 |
| 6-(1',4',5',6',7',7'-hexachloro-5'-norbornen-2'-yl)-1,2,3,4,9,9-hexachloro-1,4,4a,5,6,7,8,8a-oxtahydro-1,4-methanonaphthalene | | | 20 | 20 | 20 | 20 | 20 |
| Antimony oxide (Sb₂O₃) | | | 3 | 3 | 3 | 3 | 3 |
| Microfine high density polethylene lubricant | 1.0 | 1.0 | 1.0 | 1.0 | 1.0 | 1.0 | 1.0 |
| Tensile yield strength, ASTM D-638-61T (p.s.i.) | 9,100 | 6,700 | 6,700 | 6,600 | 7,300 | 8,200 | 9,000 |
| Elongation at break, ASTM D-638-61T (percent) | 170 | 20 | 20 | 30 | 50 | 130 | 145 |
| Tensile modulus, ASTM D-638-61T (×10⁵ p.s.i.) | 3.4 | 3.4 | 3.4 | 3.3 | 3.4 | 3.7 | 3.8 |
| Melt index at 450° F., ASTM 1238-54T modified | 0.4A3 | 1.2A½ | 1.4A¼ | 1.6B1 | 1.7A½ | 2.1A1 | 0.9A1 |
| Izod impact notched, ASTM D-256-56, Method A (ft. lb./in.) | 16.9 | 5.3 | 4.1 | 3.1 | 6.8 | 9.4 | 3.0 |
| Hardness Rockwell R/L, ASTM D-785-62 | 123/99 | 110/78 | 106 | 107 | 112/83 | 116/91 | 121/98 |
| Heat deflection temperature at 264 p.s.i. load, ASTM D-648-56 (° F. at 10 mils deflection) | 284 | 195 | 186 | 188 | 199 | 218 | 230 |
| Underwriters Laboratories flammability at 0.070 in., average for 6 ignitions (sec.) | Fail | Fail | Fail | Fail | Fail | 4.0 | 2.0 |
| General Electric oxygen index, minimum percent oxygen which will support a flame | 26.5 | 19.1 | 25.7 | 26.1 | 28.8 | 28.8 | 28.9 |

| | 12[3] | 13[3] | 13a[3] | 14 | 15 | 16 | 17 |
|---|---|---|---|---|---|---|---|
| ABS graft polymer-copolymer, 50% polybutadiene, 33% styrene, 17% acrylonitrile | | 100 | 80 | 76 | 60 | 40 | 20 |
| Polycarbonate of 2,2'-(4,4'-dihydroxy-diphenyl) propane | 100 | | | 4 | 20 | 40 | 60 |
| 6-(1',4',5',6',7',7'-hexachloro-5'-norbornen-2'-yl)-1,2,3,4,9,9-hexachloro-1,4,4a,5,6,7,8,8a-octahydro-1,4-methanohapthalene | | | 20 | 20 | 20 | 20 | 20 |
| Antimony oxide (Sb₂O₃) | | | 3 | 3 | 3 | 3 | 3 |
| Microfine high density polyethylene lubricant | 1.0 | 1.0 | 1.0 | 1.0 | 1.0 | 1.0 | 1.0 |
| Tensile yield strength, ASTM D-638-61T | 9,100 | 2,300 | 2,200 | 2,800 | 4,100 | 5,900 | 8,000 |
| Elongation at break, ASTM D-638-61T (percent) | 140 | 230 | 210 | 200 | 170 | 170 | 165 |
| Tensile modulus, ASTM D-638-61T (×10⁵ p.s.i.) | 3.4 | 1.2 | 1.2 | 1.3 | 1.7 | 2.4 | 3.1 |
| Melt index at 450° F., ASTM 1238-54T modified | 0.4A3 | [4]WNE | [4]WNE | [4]WNE | 0.6A3 | 0.7A1 | 1.9A1 |
| Izod impact notched, ASTM D-256-56, Method A (ft. lb./in.) | 16.9 | 8.0 | 7.7 | 7.8 | 8.9 | 10.8 | 12.7 |
| Hardness Rockwell R/L, ASTM D-785-62 | 123/99 | 48 | 40 | 44 | 69 | 92 | 111/83 |
| Heat deflection temperature at 264 p.s.i. load, ASTM D-648-56 (° F. at 10 mils deflection) | 284 | 159 | 150 | 165 | 178 | 198 | 228 |
| Underwriters Laboratories flammability at 0.070 in., average for 6 ignitions (sec.) | Fail | Fail | Fail | 28 | 15.5 | 2.0 | 2.0 |
| General Electric oxygen index, minimum percent oxygen which will support a flame | 26.5 | 19.1 | 28.5 | 27.1 | 31.5 | 31.5 | 31.5 |

[1] Controls.
[2] 6a, 7 and 7a are controls.
[3] 12, 13 and 13a are controls.
[4] Will not extrude.

FLAME RETARDANT ABS/POLYSULFONE AND/OR POLYCARBONATE BLENDS

| | 21[1] | 21a | 22 | 23 | 24 | 25 | 26 |
|---|---|---|---|---|---|---|---|
| An ABS graft polymer prepared by polymerizing 35% styrene and 18% acrylonitrile in the presence of 47% polybutadiene and a copolymer comprised of 66% α-methyl styrene, 29% acrylonitrile and 5% styrene (25/75) | 80 | 5 | 33 | 52 | 5 | 33 | 52 |
| Polysulfone[2] | | 5 | 14 | 14 | 5 | 14 | 14 |
| Polycarbonate of 2,2'-(4,4'-dihydroxydiphenyl) propane | | 70 | 33 | 14 | 70 | 33 | 14 |
| 1,2,3,4,9,9-hexachloro-1,4,4a,5,6,7,8,8a-octahydro-1,4-methanonaphthalene-6,7-dicarboxylic anhydride | | | 20 | 20 | 20 | | |
| 6-(1',4',5',6',7',7'-hexachloro-5'-norbornen-2'-yl)-1,2,3,4,9,9-hexachloro-1,4,4a,5,6,7,8,8a-octahydro-1,4-methanonaphthalene | 20 | | | | 20 | 20 | 20 |
| Microfine high density polyethylene lubricant | 1.0 | 1.0 | 1.0 | 1.0 | 1.0 | 1.0 | 1.0 |
| Antimony oxide (Sb₂O₃) | 3.0 | 3.0 | 3.0 | 3.0 | 3.0 | 3.0 | 3.0 |
| Tensile yield strength, ASTM D-638-61T (p.s.i.) | 8,200 | 9,550 | 9,450 | 9,200 | 9,300 | 9,200 | 8,900 |
| Elongation at break, ASTM D-638-61T (percent) | 8 | 110 | 40 | 10 | 10 | 15 | 10 |
| Tensile modulus, ASTM D-638-61T (×10⁵ p.s.i.) | 4.1 | 4.1 | 4.3 | 4.2 | 3.9 | 3.9 | 4.0 |
| Melt index at 450° F., ASTM 1238-54T modified | 1.7A1 | 1.1A1 | 2.3A1 | 2.6A1 | 1.3A3 | 1.8A1 | 1.7A1 |
| Izod impact notched, ASTM D-256-56, Method A (ft. lb./in.) | 0.9 | 1.2 | 1.0 | 0.6 | 0.8 | 0.7 | 0.7 |
| Hardness Rockwell R/L, ASTM D-785-62 | 117/92 | 124/102 | 119/98 | 118/94 | 123/101 | 119/96 | 116/92 |
| Heat deflection temperature at 264 p.s.i. load, ASTM D-648-56 (° F. at 10 mils deflection) | 211 | 234 | 218 | 212 | 247 | 228 | 220 |
| Underwriters Laboratories flammability at 0.070 in., average for 6 ignitions (sec.) | Fail | 3.7 | 2.5 | 3.7 | 2.2 | 2.5 | 2.3 |
| General Electric oxygen index, minimum percent oxygen which will support a flame | 22.9 | 34.9 | 30.2 | 25.5 | 33.8 | 28.7 | 25.7 |

| | 27[1] | 27a | 28 | 29 | 30 | 31 | 32 | 33 | 34 | 35 |
|---|---|---|---|---|---|---|---|---|---|---|
| ABS graft polymer-copolymer, 50% polybutadiene, 33% styrene, 17% acrylonitrile | 80 | 40 | 60 | 20 | 40 | 60 | 20 | 40 | 60 | 20 |
| Polysulfone[2] | | 40 | 20 | 60 | 40 | 20 | 60 | | | |
| Polycarbonate of 2,2'-(4,4'-dihydroxydiphenyl) propane | | | | | | | | 40 | 20 | 60 |
| 1,2,3,4,9,9-hexachloro-1,4,4a,5,6,7,8,8a-octahydro-1,4-methanonapthalene-6,7-dicarboxylic anhydride | | 20 | 20 | 20 | | | | 20 | 20 | 20 |
| 6-(1',4',5',6',7',7'-hexachloro-5'-norbornen-2'-yl)-1,2,3,4,9,9-hexachloro-1,4,4a,5,6,7,8,8a-octahydro-1,4-methanonapthalene | 20 | | | | 20 | 20 | 20 | | | |
| Microfine high density polyethylene lubricant | 1.0 | 1.0 | 1.0 | 1.0 | 1.0 | 1.0 | 1.0 | 1.0 | 1.0 | 1.0 |
| Antimony oxide (Sb₂O₃) | 3.0 | 3.0 | 3.0 | 3.0 | 3.0 | 3.0 | 3.0 | 3.0 | 3.0 | 3.0 |
| Tensile yield strength, ASTM D-638-61T (p.s.i.) | 2,200 | 5,900 | 4,000 | 8,600 | 5,600 | 3,900 | 8,400 | 5,800 | 4,150 | 7,500 |
| Elongation at break, ASTM D-638-61T (percent) | 210 | 25 | 45 | 10 | 10 | 115 | 15 | 145 | 115 | 160 |
| Tensile modulus, ASTM D-638-61T (×10⁵ p.s.i.) | 1.2 | 2.8 | 3.2 | 1.7 | 3.0 | 2.6 | 2.1 | 2.1 | 3.2 | |
| Melt index at 450° F, ASTM 1238-54T modified | [3]WNE | 0.5A3 | [3]WNE | 0.5A1 | [3]WNE | [3]WNE | 0.7A3 | 0.4A1 | 0.6A1 | 0.3A1 |
| Izod impact notched, ASTM D-256-56, Method A (ft. lb./in.) | 7.7 | 0.8 | 1.5 | 0.5 | 1.1 | 2.1 | 0.6 | 10.7 | 6.9 | 13.0 |
| Hardness Rockwell R/L, ASTM D-785-62 | 40 | 91 | 65 | 112/85 | 88 | 59 | 110/79 | 95 | 77 | 114/83 |
| Heat deflection temperature 264 p.s.i. load ASTM D-648-56 (° F. at 10 mils deflection) | 150 | 201 | 175 | 269 | 198 | 171 | 275 | 200 | 178 | 221 |
| Underwriters Laboratories flammability at 0.070 in., average for 6 ignitions (sec.) | Fail | 2.2 | 5.8 | 1.7 | 1.7 | 4.7 | 1.3 | 5.0 | Fail | 2.8 |
| General Electric oxygen index, minimum percent oxygen which will support a flame | 28.5 | 31.5 | 27.6 | | 28.9 | | 27.1 | 24.8 | | 29.2 |

[1] Control.

[2] Polysulfone 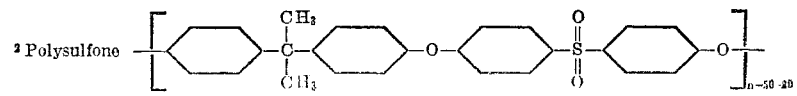

[3] Will not extrude.

As used herein, melt indexes express the weight in grams of polymer blend discharged in one or three minutes through an orifice 0.125 in. in diameter and 0.315 in. long from a reservoir 0.376 in. in diameter containing polymer at a temperature of 450° F. and under a pressure produced by 5664 g. load. Thus, the melt index of 0.4A3 of Example 1 means that 0.4 g. of polymer was discharged through the orifice in three minutes under the conditions given and the melt index of 1.9 Al of Example 3 means that 1.9 g. of polymer were discharged through the orifice in one minute under the conditions given.

DESCRIPTION OF STANDARD METHOD OF TEST FOR FLAMMABILITY OF PLASTICS USING THE OXYGEN INDEX METHOD

The General Electric Oxygen Index Test is a method of determining the relative flammability of plastics. The oxygen index of a material is the minimum concentration of oxygen, expressed in percent by volume, in the oxygen/nitrogen mixture, which will support combustion.

This test method has not yet been adopted by ASTM. ASTM testing has been completed and the final balloting is in progress.

STANDARD METHOD OF TEST FOR FLAMMABILITY OF PLASTICS USING THE OXYGEN INDEX METHOD THERE IS NO ASTM DESIGNATION

(1) Scope (1.1) This method describes a procedure for determining the relative flammability of plastics by measuring the minimuum concentration of oxygen in a slowly-rising mixture of oxygen and nitrogen that will support combustion. This method is presently limited to the use of physically self-supporting plastic test specimens.

(2) Significance (2.1) This method provides a means for comparing the relative flammability of physically self-supporting plastics. Correlation with flammability under actual use conditions is not necessarily implied.

(3) Definition (3.1) Oxygen index is the minimum concentration of oxygen, expressed as percent by volume, in a mixture of oxygen and nitrogen which will support combustion of a material under conditions of this method.

(4) Principle of method (4.1) The minimum concentration of oxygen in a slowly-rising mixture of oxygen and nitrogen that will support combustion is measured under equilibrium conditions of candle-like burning. The balance between the heat from the combustion of the specimen and the heat lost to the surroundings establishes the equilibrium. This point is approached from both sides of the critical oxygen concentration in order to establish the Oxygen Index.

(5) Apparatus (5.1) Test column.—The column consists of a heat resistant glass tube 7.5 cm. minimum inside diameter and 45 cm. minimum height. The bottom of the column or the base to which the tube is attached contains noncombustible material to mix and distribute evenly the gas mixture entering at this base. Glass beads (3 to 5 mm. diameter) in a bed 8 to 10 cm. deep have been found suitable.

(5.2) Specimen holder.—Any small holding device which will support the specimen at its base and hold it vertically in the center of the column is acceptable.

(5.3) Gas supply.—Commercial grade oxygen and nitrogen shall be used. If an air supply is used with oxygen or nitrogen, it must be clean and dry.

(5.4) Flow measurement and control devices.—Suitable flow measurement and control devices shall be available in each line which will allow monitoring the volumetric flow of each gas into the column within 1%. After the flow is measured in each line, the lines should be joined to allow the gases to mix before being fed into the column.

(5.5) Ingition source.—The igniter should be a tube with a hydrogen, propane or natural gas flame at the end which can be inserted into the open end of the column to ignite the test specimen. A suitable flame may be from 6–12 mm. long.

(5.6) Time.—A suitable timer capable of indicating at least 10 minutes and accurate to five seconds shall be used.

(5.7) Soot, fumes and heat removal.—To insure the removal of toxic fumes, soot, heat and other possible noxious products, the column shall be installed in a hood or other facilities providing adequate exhaust.

(6) Test specimens (6.1) At least 10 specimens 7 to 15 cm. long by 6.5±0.5 mm. wide and 3.0±0.5 mm. thick shall be cut from the material being tested.

(7) Procedure (7.1) The flow measuring system shall be calibrated using a water-sealed rotating drum meter (wet test meter) in accordance with ASTM method D–1071, Standard Methods for Measurement of Gaseous Fuel Samples, or by other equivalent calibration devices. It is recommended that this calibration be repeated at least every six months.

(7.2) Clamp the specimen in the holder vertically in the approximate center of the column with the top of the specimen at least 10 cm. below the top of the open column.

(7.3) Select the desired initial concentration of oxygen based on past experience with similar materials. If there is no experience with the material, light a specimen in the air and note the burning. If the specimen burns rapidly, start at a concentration of about 18%, but if the specimen goes out, select a concentration of about 25% or higher depending on the difficulty of ignition and time of burning.

(7.4) Set the flow valves so that the desired initial concentration of oxygen is flowing through the column. The gas flow rate in the column shall be 4±1 cm. per second at standard temperature (0° C.) and pressure (760 mm.), as calculated from the total of gas in cc. per second, divided by the area of the column in cm.$^2$.

(7.5) Allow the gas to flow for 30 seconds to purge the system.

(7.6) Ignite the top of the specimen with the ignition flame so that the specimen is well lit and the entire top is burning. Remove the ignition flame and start the timer.

(7.6.1) The concentration of oxygen is too high and must be reduced if (a) the specimen burns 3 minutes or longer, or
(b) the specimen burns 5 cm.

(7.62) The concentration of oxygen must be raised if the specimen is extinguished before burning 3 minutes or 5 cm.

(7.7) Adjust the oxygen concentration, insert a new specimen or, if the previous specimen is long enough, turn it end for end or cut off the burned end, then purge and reignite.

(7.8) Continue repeating (7.5) through (7.7) until the limiting concentration of oxygen is determined. This is the lowest oxygen concentration which will meet the conditions of (7.6.1). At the next lowest concentration possible with the equipment, the specimen should extinguish as defined in (7.6.2).

(7.9) For a material having consistent burning characteristics, the difference in oxygen concentration between burning per (7.6.1) and not burning per (7.6.2) may range from 0.1 to 0.3% depending on the sensitivity of the flow measuring equipment and upon the particular oxygen concentration involved. Some materials, however, exhibit erratic burning characteristics because of inhomogeneity, char formation, dripping, bending, etc., which causes a larger difference between burning and not burning. In such cases, the limiting concentration should be determined by a statistical testing method.

(7.10) Perform the test at least three times by starting at a slightly different flow rate still within the 3 to 5 cm. per seconds limits and again performing steps (7.4) to (7.8).

(8) Precision (8.1) Based on the results of a statistically designed round-robin testing program in which 18 laboratories checked five materials, the standard deviation of the mean of three replicates (for comparing lab-to-lab) was as follows:

(a) For materials with an oxygen index below 21, the standard deviation was below 0.4.
(b) For materials with an oxygen index above 21, the stadard deviation ranged from 0.7 to 1.4. The higher value was for a material which exhibits the erratic behavior noted in 7.9.
(c) The standard deviation within a laboratory ranged from 0.1 for clean burning materials to 1.0 for erratic materials.

(9) Calculation (9.1) Calculate the oxygen index, $n$ of the material by using the following formula:

$$n\% = \frac{100 \times O}{O_2 + N_2}$$

where $O_2$ is the volumetric flow of oxygen, cc. per second, at the limiting concentration determined in (7.8) and $N_2$ is the corresponding volumetric flow rate of nitrogen, cc. per second. If air is used and either oxygen or nitrogen is added as required, calculate $n$ assuming the composition of the air is 20.9% oxygen and 79.1% nitrogen as follows:

$$n\% = \frac{(100 \times O_2) + (20.9 \times A)}{O_2 + N_2 + A}$$

where $A$ is the volumetric flow rate of air in cc. per second; $O_2$ and $N_2$ are the volumetric flow rates of oxygen and nitrogen added to the mixture. One of these will be zero depending on which gas is added.

(10) Report (10.1) The report shall include (10.1.1) a description of the material tested including as much as is known about the type, source, manufacturer's code number, form and principal dimensions and previous history;
(10.1.2) test specimen dimensions;
(10.1.3) average oxygen index value;
(10.1.4) individual oxygen index values found for each of the tests;
(10.1.5) description of any unusual behavior such as charring, dripping, bending, etc.

(11) References (1) Candle-type Test for Flammability of Polymers, C. P. Fenimore and F. J. Martin, Modern Plastics 43, 141 (November 1966).
(2) Oxygen Index: Key to Precise Flammability Ratings, K. B. Goldblum, Spe Journal 25, 50 (February 1969).
(3) An Accurate Gas Metering System for Laminar Flow Studies, J. W. Andersen and R. Friedman, Review of Scientific Instruments 20, 61 (1949).

The examples set forth in the tables are illustrative of the many blends that may be prepared in accordance with the instant invention. The examples are not meant to limit the invention, however, and the scope of the present invention is defined solely by the appended claims which should be construed as broadly as is consistent with the prior art.

What is claimed is:

1. A thermoplastic blend comprised of Components A, B, C and D and wherein Component A is from about 5% by weight to about 90% by weight graft polymer-copolymer prepared by polymerizing from about 40–95% by weight of a monovinylaromatic hydrocarbon component selected from the group consisting of monovinylaromatic hydrocarbon monomers and mixtures of monovinylaromatic hydrocarbon monomers and a monomer selected from the group consisting of acrylonitrile, alkyl and halogen substituted acrylonitrile, and acarylic acid esters in the presence of from about 60% by weight to about 5% by weight of a prepolymerized polymer selected from the group consisting of conjugated diene homopolymers and copolymers prepared by polymerizing a conjugated diene with a monomer copolymerizable therewith and wherein the graft polymer-copolymer blend is comprised of from 10–90% by weight graft polymer and correspondingly 90–10% by weight copolymer; B from about 90% by weight to about 5% by weight of a material selected from the group consisting of polycarbonate resins selected from the group consisting of polycarbonate of the general formulae

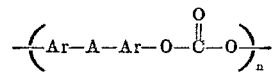

and

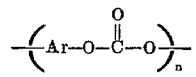

wherein Ar is selected from the group consisting of phenylene and alkyl, alkoxyl, halogen and nitro-substituted phenylene, A is selected from the group consisting of carbon-to-carbon bond, alkylidene, cycloalkylidene, alkylene, cycloalkylene, imino, azo, oxygen, sulfur, sulfoxide and sulfone and $n$ is at least two, polysulfone resin of the formula

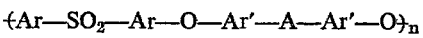

wherein Ar and Ar' are selected from the group consisting of phenylene and alkyl-, alkoxy-, halogen-and nitro-substituted phenylene and A is selected from the group consisting of carbon-to-carbon bond, alkylidene, cycloalkylidene, carbonyl, sulfoxide, sulfur, sulfone, azo, imino, and oxygen and $n$ is at least two, and polysulfone/polycarbonate resin mixtures and wherein the ratio of polycarbonate to polysulfone in the mixture is from 90% to 10% polycarbonate and correspondingly 10% to 90% polysulfone; C from about 5% by weight to about 40% by weight of a material selected from the group consisting of (1) halogenated norbornene methanonaphthalene compounds of the formula:

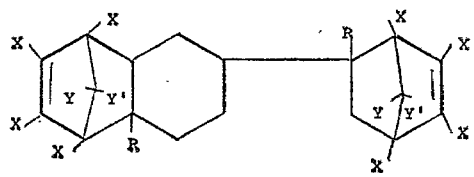

in which X is halogen; Y and Y' are selected from the group consisting of hydrogen, halogen, lower (1–4C) alkyl, lower (1–4C) alkoxy, and halogen substituted lower (1–4C) alkyl and alkoxy radicals; and R is selected from the group consisting of hydrogen, lower (1–4C) alkyl and halogen radicals and (2) polyhaloalkanonaphthalene dicarboxylic acid anhydride or acid prepared by the Diels-Alder reaction of hexahalocyclopentadiene with the condensation product of a $C_4$–$C_{18}$ olefinic dicarboxyilc acid anhydride with a $C_4$–$C_9$ conjugated diene; and D from 0 to about 10% by weight of an antimony-containing additive.

2. The thermoplastic blend of claim 1 wherein the monovinylaromatic hydrocarbon monomer is selected from the group consisting of styrene and mixtures of alphamethylstyrene and styrene and wherein the monomer selected from the group consisting of acrylonitrile, alkyl and halogen substituted acrylonitrile and acrylic acid esters is acrylonitrile, and the polymeric compound selected from the group consisting of conjugated diene homopolymers and conjugated copolymers is polybutadiene.

3. The thermoplastic blend of claim 1 wherein the halogenated norbornene methanonaphthalene compound is 6 - (1',4',5',6',7',7 - hexachloro - 5'-norbornen-2'-yl)- 1,2,3,4,9,9 - hexachloro - 1,3,4a,5,6,7,8,8a - octahydro-,4-methanonaphthalene.

4. The thermoplastic blend of claim 1 wherein the substituted carboxylic acid anhydride is 1,2,3,4,9,9-hexachloro - 1,4,4a,5,6,7,8,8a-octahydro-1,4-methanonaphthalene-6,7-dicarboxylic anhydride.

References Cited

UNITED STATES PATENTS

| | | | |
|---|---|---|---|
| 2,799,614 | 7/1957 | Mark | 260—611 |
| 2,900,377 | 8/1959 | Fields | 260—139 |
| 2,952,710 | 9/1960 | Fields | 260—648 |
| 2,952,711 | 9/1960 | Roberts | 260—648 |
| 3,050,567 | 8/1962 | Schmerling | 260—648 |
| 3,201,484 | 8/1965 | Myers et al. | 260—666 |
| 3,130,177 | 4/1964 | Grabowski | 260—873 |
| 3,152,172 | 6/1964 | Roberts et al. | 260—468 |
| 3,242,231 | 3/1966 | Graham et al. | 260—873 |
| 3,373,225 | 3/1968 | Degginger | 260—863 |
| 3,442,977 | 5/1969 | Grabowski | 260—876 |
| 3,499,950 | 3/1970 | Weitzel et al. | 260—876 |
| 3,502,744 | 3/1970 | Weitzel et al. | 260—876 |

WILLIAM H. SHORT, Primary Examiner

E. WOODBERRY, Assistant Examiner

U.S. Cl. X.R.

260—45.7 R, 45.8 R, 45.85, DIG. 24, 876

UNITED STATES PATENT OFFICE
CERTIFICATE OF CORRECTION

Patent No. 3,649,712  Dated March 14, 1972

Inventor(s) Thomas S. Grabowski

It is certified that error appears in the above-identified patent and that said Letters Patent are hereby corrected as shown below:

Column 12, line 14, "acarylic" should read -- acrylic --. Column 13, line 16, cancel "3", second occurrence, and insert -- 4 --.

Signed and sealed this 24th day of October 1972.

(SEAL)
Attest:

EDWARD M. FLETCHER, JR.
Attesting Officer

ROBERT GOTTSCHALK
Commissioner of Patents